United States Patent
Harris et al.

(10) Patent No.: US 9,358,941 B1
(45) Date of Patent: Jun. 7, 2016

(54) BUMPERS INCLUDING A REINFORCEMENT PATCH AND VEHICLES INCORPORATING THE SAME

(71) Applicant: Toyota Motor Engineering & Manufacturing North America, Inc., Erlanger, KY (US)

(72) Inventors: Ryan Craig Harris, Saline, MI (US); Mingher Fred Shen, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/602,346

(22) Filed: Jan. 22, 2015

(51) Int. Cl.
*B60R 19/02* (2006.01)
*B60R 19/18* (2006.01)

(52) U.S. Cl.
CPC ..................... *B60R 19/18* (2013.01)

(58) Field of Classification Search
CPC ........................................ B60R 19/02
USPC ........................ 293/102, 120, 155
See application file for complete search history.

(56) References Cited

U.S. PATENT DOCUMENTS

| | | | |
|---|---|---|---|
| 6,286,879 B1 | 9/2001 | Haque et al. | |
| 6,540,276 B2 | 4/2003 | Azuchi et al. | |
| 6,988,753 B1 | 1/2006 | Omura et al. | |
| 7,073,831 B2 * | 7/2006 | Evans | 293/155 |
| 7,338,099 B2 | 3/2008 | Okabe et al. | |
| 7,533,912 B2 | 5/2009 | Frederick et al. | |
| 7,537,252 B2 | 5/2009 | Nagai et al. | |
| 7,874,600 B2 | 1/2011 | Hashimura | |
| 7,896,408 B2 | 3/2011 | Hashimoto et al. | |
| 8,419,091 B2 * | 4/2013 | Roll et al. | 293/120 |
| 8,500,178 B2 * | 8/2013 | Tsuyuzaki et al. | 293/102 |
| 2007/0228747 A1 * | 10/2007 | Hodoya et al. | 293/102 |

* cited by examiner

*Primary Examiner* — H Gutman
(74) *Attorney, Agent, or Firm* — Dinsmore & Shohl LLP (57) ABSTRACT

A bumper beam assembly includes a reinforcement beam, the reinforcement beam including a front side, a top side, and a bottom side that is positioned opposite of the top side of the reinforcement beam, and a reinforcement patch coupled to the reinforcement beam, where the reinforcement patch extends across the top side and the bottom side of the reinforcement beam and the reinforcement patch includes a longitudinal deformation feature that is detached and spaced apart from at least one of the top side and the bottom side of the reinforcement beam.

16 Claims, 4 Drawing Sheets

BUMPERS INCLUDING A REINFORCEMENT PATCH AND VEHICLES INCORPORATING THE SAME

TECHNICAL FIELD

The present specification generally relates to bumpers and vehicles that include bumpers, and more specifically, bumpers that include a reinforcement patch.

BACKGROUND

Vehicles may be equipped with bumper systems and impact protection structures that elastically and plastically deform to absorb energy in the event of an impact.

In one example, during a small front bumper overlap impact, a substantial portion of energy from the impact may be directed outboard of many of the energy absorbing structures of the vehicle. In particular, a substantial portion of the energy from the impact is directed into the bumper assembly at a position that is outboard of many of the energy absorbing structures of the vehicle, and the energy from the impact may not be absorbed or may only be partially absorbed by those energy absorbing structures of the vehicle. Accordingly, vehicles may include various structures and reinforcements to absorb and direct energy associated with a small front bumper overlap impact. The structures and reinforcements may be positioned at outboard locations of the vehicle and may increase a stiffness of the vehicle and vehicle components evaluated in a vehicle longitudinal direction at outboard locations. While increasing the stiffness of the vehicle and vehicle components at outboard locations may absorb and direct energy associated with a small front bumper overlap impact, the structures and reinforcements may influence the vehicle to respond in a non-symmetrical manner during a flat frontal barrier impact.

Accordingly, a need exists for alternative structures for transferring energy and absorbing energy from an impact.

SUMMARY

In one embodiment, a bumper beam assembly includes a reinforcement beam that extends in a vehicle lateral direction, the reinforcement beam including a front side that is oriented to face forward in a vehicle longitudinal direction that is transverse to the vehicle lateral direction, a top side that is oriented to face in a direction that is transverse to the front side of the reinforcement beam, and a bottom side that is oriented to face in a direction that is transverse to the front side of the reinforcement beam and is positioned opposite of the top side of the reinforcement beam, and a reinforcement patch coupled to the reinforcement beam, where the reinforcement patch extends across the top side and the bottom side of the reinforcement beam and the reinforcement patch includes a longitudinal deformation feature that is detached and spaced apart from at least one of the top side and the bottom side of the reinforcement beam.

In another embodiment, a vehicle includes a side support that extends in a vehicle longitudinal direction, a bumper beam assembly coupled to the side support, the bumper beam assembly including a reinforcement beam that extends in a vehicle lateral direction, the reinforcement beam including a front side that is oriented to face forward in the vehicle longitudinal direction, a top side that is oriented to face in a direction that is transverse to the front side of the reinforcement beam, and a bottom side that is oriented to face in a direction that is transverse to the front side of the reinforcement beam and is positioned opposite of the top side of the reinforcement beam, and a reinforcement patch coupled to the reinforcement beam, where the reinforcement patch extends across the top side and the bottom side of the reinforcement beam and the reinforcement patch includes a longitudinal deformation feature that is detached and spaced apart from at least one of the top side and the bottom side of the reinforcement beam.

In yet another embodiment a vehicle includes a side support that extends in a vehicle longitudinal direction, bumper beam assembly coupled to the side support, the bumper beam assembly including a reinforcement beam that extends in a vehicle lateral direction, the reinforcement beam including a front side that is oriented to face forward in the vehicle longitudinal direction, a top side that is oriented to face in a direction that is transverse to the front side of the reinforcement beam, and a bottom side that is oriented to face in a direction that is transverse to the front side of the reinforcement beam and is positioned opposite of the top side of the reinforcement beam, and a reinforcement patch coupled to the top side of the reinforcement beam at an upper securement location, where the reinforcement patch extends across the top side and the bottom side of the reinforcement beam and where the reinforcement patch includes a longitudinal deformation feature including an upper rib that is positioned forward of the upper securement location in the vehicle longitudinal direction and that extends in the vehicle lateral direction across the top side of the reinforcement beam, the upper rib forming an upper channel that is at least partially enclosed between the reinforcement beam and the reinforcement patch, where when a barrier impacts the bumper beam assembly in a flat frontal barrier impact, the upper channel collapses in the vehicle longitudinal direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include bumper beam assemblies that include a reinforcement beam and a reinforcement patch. The reinforcement beam includes a front side, a top side, and a bottom side that is positioned opposite of the top side of the reinforcement beam. The reinforcement patch of the bumper beam assembly extends across the top side and the bottom side of the reinforcement beam and the reinforcement patch includes a longitudinal deformation feature that is detached and spaced apart from at least one of the top side and the bottom side of the reinforcement beam. In one embodiment, the bumper beam assembly is coupled to a side support of the vehicle. In another embodiment, the longitudinal deformation feature includes an upper rib that forms an upper channel that is at least partially enclosed between the reinforcement beam and the reinforcement patch, where when a barrier impacts the bumper beam assembly in a flat frontal barrier impact, the upper channel collapses in the vehicle longitudinal direction. As the upper channel may collapse in the vehicle longitudinal direction, the upper rib may selectively reduce a strength and/or stiffness of the reinforcement patch evaluated in the vehicle longitudinal direction which may encourage the reinforcement patch to plastically and elastically deform during an impact, thereby absorbing energy associated with the impact. These and other embodiments will be described in more detail below in reference to the appended drawings.

As used herein, the term "vehicle longitudinal direction" refers to the forward-rearward direction of the vehicle (i.e., in the +/− vehicle X-direction as depicted). The term "vehicle lateral direction" refers to the cross-vehicle direction (i.e., in the +/− vehicle Y-direction as depicted), and is transverse to the vehicle longitudinal direction. The term "vehicle vertical direction" refers to the upward-downward direction of the vehicle (i.e., in the +/− vehicle Z-direction as depicted). Further, the terms "inboard" and "outboard" are used to describe the relative positioning of various components of the vehicle. Referring to FIGS. 1-4, the term "outboard" as used herein refers to the relative location of a component in direction 12 with respect to a vehicle centerline 10. The term "inboard" as used herein refers to the relative location of a component in direction 14 with respect to a vehicle centerline 10. Because the vehicle structures and components may be generally symmetrical about the vehicle centerline 10, the direction to which use of terms "inboard" and "outboard" refer may be mirrored about the vehicle centerline 10 when evaluating components positioned along opposite sides of the vehicle 100.

Motor vehicles that incorporate elements according to the present disclosure may include a variety of construction methodologies that are conventionally known, including the unibody construction methodology as depicted, as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Figure 1:
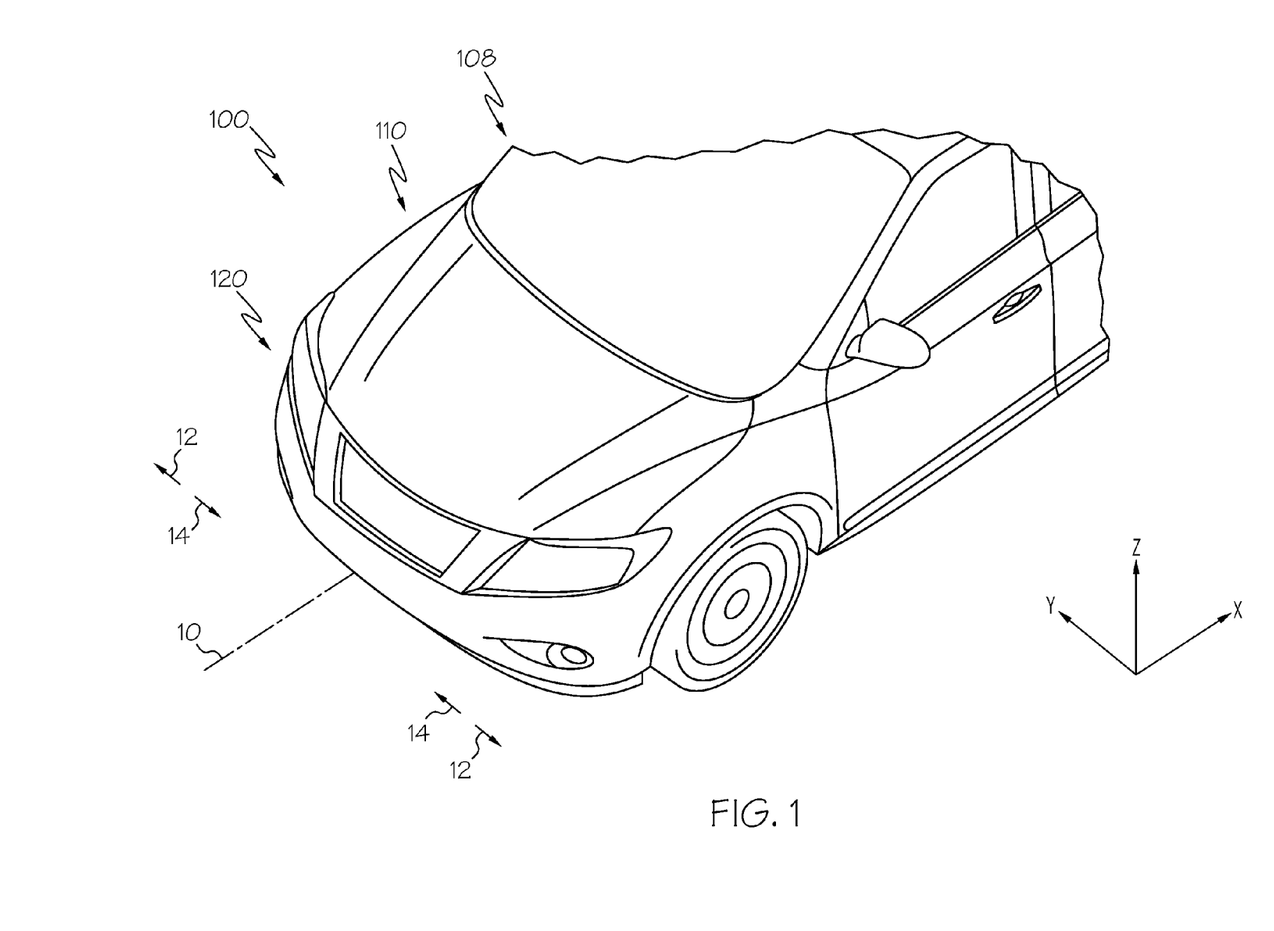
FIG. 1 schematically depicts a perspective view of a vehicle including a bumper according to one or more embodiments shown or described herein.

Referring initially to FIG. 1, a vehicle 100 is depicted. The vehicle 100 includes a body 110 onto which a vehicle drivetrain is coupled. The vehicle 100 also includes a cabin 108 that is integral with the body 110. The cabin 108 generally defines a passenger cabin of the vehicle 100. The vehicle 100 includes a bumper 120 that is positioned at the front of the vehicle 100.

Figure 2:
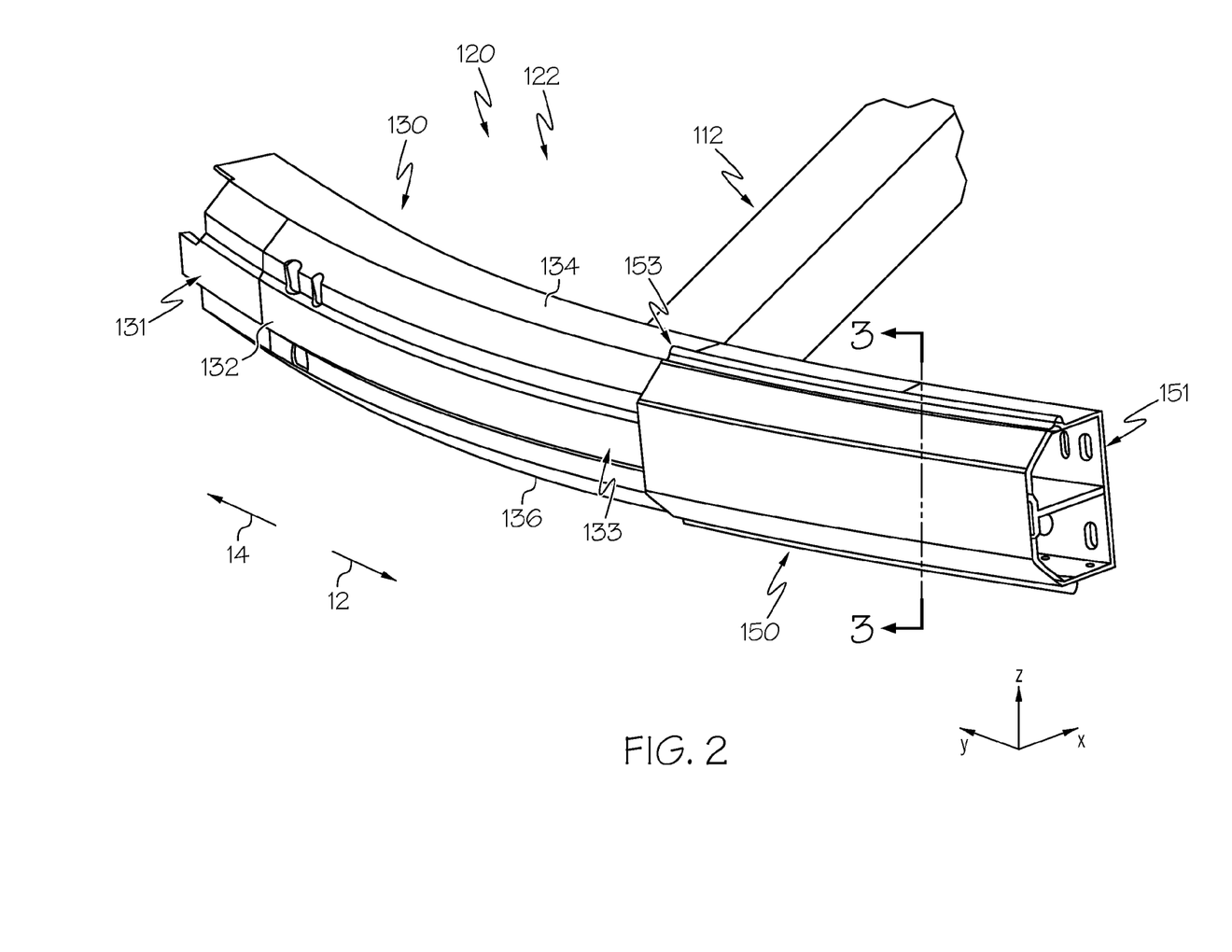
FIG. 2 schematically depicts a perspective view of a bumper beam assembly including a reinforcement beam and a reinforcement patch according to one or more embodiments shown or described herein.

Referring to FIG. 2, the bumper 120 is depicted in isolation. The bumper 120 includes a bumper beam assembly 122 that includes a reinforcement beam 130 and a reinforcement patch 150. It should be noted that while only one reinforcement patch 150 is illustrated in FIG. 2, the opposite side of the reinforcement beam 130 may include the same or similar reinforcement patch 150. The reinforcement beam 130 extends in the vehicle lateral direction, terminating at opposite sides of the vehicle 100. The reinforcement beam 130 may have a generally curved shape, as depicted in FIG. 2. More specifically, the reinforcement beam 130 includes a front side 132 that is oriented to face forward in the vehicle longitudinal direction. An inboard position 131 on the front side 132 of the reinforcement beam 130 may be positioned forward of an outboard position 133 on the front side 132 of the reinforcement beam 130 in the vehicle longitudinal direction, thereby giving the reinforcement beam 130 a generally curved shape. In other embodiments, the reinforcement beam 130 may have a generally straight shape extending in the vehicle lateral direction. The reinforcement beam 130 may alternatively have any suitable shape that extends in the vehicle lateral direction.

The bumper beam assembly 122 includes the reinforcement patch 150 that is coupled to the reinforcement beam 130. The reinforcement patch 150 may be positioned at an outboard end 135 of the reinforcement beam 130 in the vehicle lateral direction. The reinforcement patch 150 may be positioned over the reinforcement beam 130 such that the reinforcement patch 150 at least partially encapsulates or nests with the reinforcement beam 130. It should be noted that the reinforcement patch 150 may be formed from a variety of materials including, for example and without limitation, metals, composites, and the like, and may be formed by any suitable method or combination of methods such as stamping, forging, machining, and the like. The reinforcement patch 150 may be coupled to the reinforcement beam 130 through a variety of joining techniques, including, but not limited to, a welded attachment, a brazed attachment, mechanical fasteners, and/or structural adhesives.

The body 110 of the vehicle 100 includes a side support 112 that extends in the vehicle longitudinal direction and that is coupled to the bumper beam assembly 122. At least a portion of the reinforcement patch 150 may be positioned outboard of the side support 112 in the vehicle lateral direction. In some embodiments, the entire reinforcement patch 150 may be positioned outboard of the side support 112 in the vehicle lateral direction. In other embodiments, an outboard end 151 of the reinforcement patch 150 may be positioned outboard of the side support 112 and an inboard end 153 of the reinforcement patch 150 may be positioned inboard of the side support 112, thereby straddling the side support 112 in the vehicle lateral direction. By positioning at least a portion of the reinforcement patch 150 outboard of the side support 112 in the vehicle lateral direction, the reinforcement patch 150 may resist and redirect forces that may be applied to the bumper beam assembly 122 at positions outboard of the side support 112, such as forces that may be associated with a small front bumper overlap impact. Further, by positioning at least a portion of the reinforcement patch 150 outboard of the side support 112 in the vehicle lateral direction, the reinforcement patch 150 may provide additional structure in addition to the reinforcement beam 130 at positions outboard of the side support 112 that may plastically and elastically deform to absorb energy associated with an impact, such as a small front bumper overlap impact.

Figure 3:
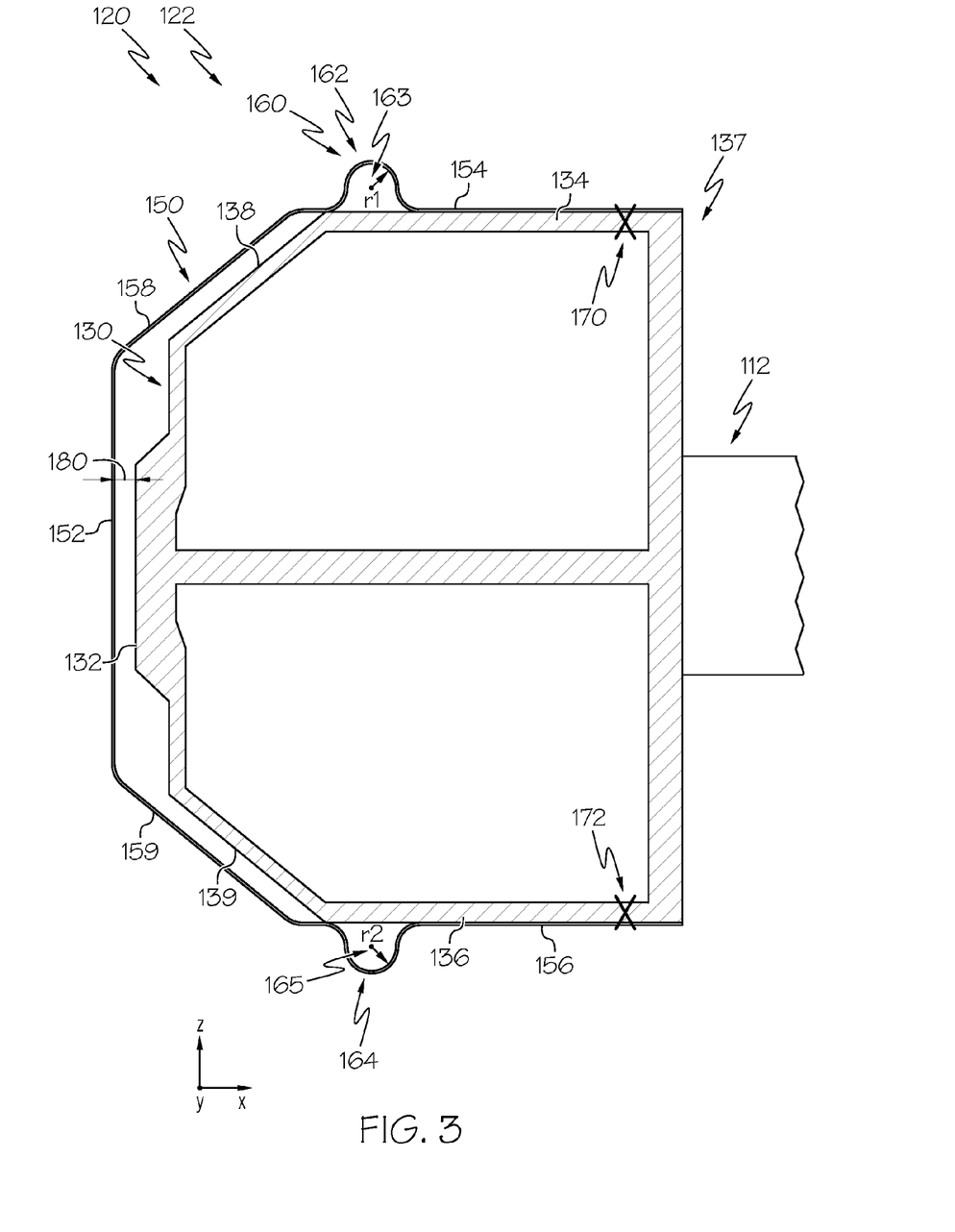
FIG. 3 schematically depicts a section view of the reinforcement beam and the reinforcement patch of FIG. 2 along section 3-3 according to one or more embodiments shown or described herein.

Referring to FIG. 3, a cross section of the reinforcement beam 130 and the reinforcement patch 150 along section 3-3 of FIG. 2 is shown. As shown in FIG. 3, the reinforcement patch 150 may at least partially encapsulate the reinforcement beam 130. The reinforcement patch 150 includes a front side 152 that is oriented to face forward in the vehicle longitudinal direction. The front side 152 of the reinforcement patch 150 may be positioned forward of the front side 132 of the reinforcement beam 130 in the vehicle longitudinal direction such that a gap 180 extends between the front side 152 of the reinforcement patch 150 and the front side 132 of the reinforcement beam 130. The gap 180 between the front side 152 of the reinforcement patch 150 and the front side 132 of the reinforcement beam 130 may allow the reinforcement patch 150 to selectively deform during a flat frontal barrier impact. One of the front side 132 of the reinforcement beam 130 and the front side 152 of the reinforcement patch 150 may include a contoured surface and the other may include a planar surface, as depicted in FIG. 3. In other embodiments, the front side 132 of the reinforcement beam 130 and the front side 152 the reinforcement patch 150 may be generally planar surfaces that extend in the vehicle lateral direction. In some embodiments, both the front side 132 of the reinforcement beam 130 and the front side 152 of the reinforcement patch 150 may include contoured surfaces that extend in the vehicle lateral direction. The front side 132 of the reinforcement beam 130 and the front side 152 of the reinforcement patch 150 may alternatively include any suitably shaped surface.

The reinforcement beam 130 includes a top side 134 and a bottom side 136 that is positioned opposite the top side 134. Likewise, the reinforcement patch 150 includes a top side 154 and a bottom side 156 that is positioned opposite the top side 154. The top sides 134, 154 and the bottom sides 136, 156 of the reinforcement beam 130 and the reinforcement patch 150 may be oriented transverse to the front sides 132, 152 of the reinforcement beam 130 and the reinforcement patch 150. In some embodiments, such as the embodiment shown in FIG. 3, the reinforcement beam 130 may include a first chamfered side 138 that is positioned between the front side 132 and the top side 134 of the reinforcement beam 130 in the vehicle longitudinal direction. The reinforcement beam 130 may also include a second chamfered side 139 that is positioned between the front side 132 and the bottom side 136 in the vehicle longitudinal direction. The reinforcement patch 150 may include a first chamfered side 158 that is positioned between the front side 152 and the top side 154 of the reinforcement patch 150 in the vehicle longitudinal direction. Likewise, the reinforcement patch 150 may include a second chamfered side 159 that is positioned between the front side 152 and the bottom side 156 of the reinforcement patch 150 in the vehicle longitudinal direction. The first chamfered sides 138, 158 of the reinforcement beam 130 and the reinforcement patch 150 may extend rearward and upward from the front sides 132, 152 of the reinforcement beam 130 and the reinforcement patch 150. The second chamfered sides 139, 159 of the reinforcement beam 130 and the reinforcement patch 150 may extend rearward and downward from the front side sides 132, 152 of the reinforcement beam 130 and the reinforcement patch 150. The first chamfered sides 138, 158 and the second chamfered sides 139, 159 of the reinforcement beam 130 and the reinforcement patch 150 may accommodate packaging and styling constraints of the bumper beam assembly 122 and/or may allow for selective deformation of the reinforcement beam 130 and the reinforcement patch 150 during an impact.

The top side 154 and the bottom side 156 of the reinforcement patch 150 may extend across the top side 134 and the bottom side 136 of the reinforcement beam 130 in the vehicle longitudinal direction, respectively. In some embodiments, such as the embodiment depicted in FIG. 3, the top side 154 and the bottom side 156 of the reinforcement patch 150 may extend rearward across the top side 134 and the bottom side 136 of the reinforcement beam 130 to a rear side 137 of the reinforcement beam 130. The top side 154 and the bottom side 156 of the reinforcement patch 150 may provide additional structure that may elastically and plastically deform to absorb energy associated with an impact, such as a small front bumper overlap impact. Further, the top side 154 and the bottom side 156 of the reinforcement patch 150 may increase a section modulus of the bumper beam assembly 122 as compared to positions of the bumper beam assembly 122 that do not include a reinforcement patch 150 with a top side 154 and a bottom side 156. The section modulus of a cross-sectional shape can be a direct measure of its strength and a higher section modulus can support greater loads. By increasing the section modulus of the bumper beam assembly 122, the top side 154 and/or the bottom side 156 of the reinforcement patch 150 resist and redirect forces that may be applied to the reinforcement patch 150 of the bumper beam assembly 122, such as forces that may be associated with a small front bumper overlap impact.

The reinforcement patch 150 includes a longitudinal deformation feature 160 positioned on at least one of the top side 154 and the bottom side 156 of the reinforcement patch 150. The longitudinal deformation feature 160 may be detached and spaced apart from the top side 134 of the reinforcement beam 130. In some embodiments, the longitudinal deformation feature 160 may be detached and spaced apart from the top side 134 of the reinforcement beam 130 at a position that is rearward of the first chamfered side 158 of the reinforcement patch 150 in the vehicle longitudinal direction. The longitudinal deformation feature 160 may include an upper rib 162 that is positioned on the top side 154 of the reinforcement patch 150, where the upper rib 162 extends upward in the vehicle vertical direction such that the top side 154 of the reinforcement patch 150 is detached and spaced apart from the top side 134 of the reinforcement beam 130. The upper rib 162 may extend in the vehicle lateral direction across the top side 134 of the reinforcement beam 130 and may be positioned between the front side 132 and the rear side 137 of the reinforcement beam 130 in the vehicle longitudinal direction. The upper rib 162 may be positioned forward of an upper securement position 170 that couples the top side 154 of the reinforcement patch 150 to the top side 134 of the reinforcement beam 130.

The upper rib 162 may have a radius of curvature r1. The radius of curvature r1 of the upper rib 162 may increase a resistance to bending of the reinforcement patch 150 about the vehicle vertical direction. More specifically, the radius of curvature r1 may increase the section modulus of the reinforcement patch 150 such that the upper rib 162 increases the resistance to bending of the reinforcement patch 150 about the vehicle vertical direction. By increasing the resistance to bending of the reinforcement patch 150 about the vehicle vertical direction, the upper rib 162 may resist and redirect forces that may be applied to a limited portion of the reinforcement patch 150, such as bending forces associated with a small front bumper overlap impact that may act to bend portions of the reinforcement beam 130 inboard in the vehicle lateral direction toward the side support 112.

The longitudinal deformation feature 160 may also be or may alternatively be detached and spaced apart from the bottom side 136 of the reinforcement beam 130. In some embodiments, the longitudinal deformation feature 160 may be detached and spaced apart from the bottom side 136 of the reinforcement beam 130 at a position that is rearward of the second chamfered side 159 of the reinforcement patch 150 in the vehicle longitudinal direction. The longitudinal deformation feature 160 may include a lower rib 164 that is positioned on the bottom side 156 of the reinforcement patch 150, where the lower rib 164 extends downward in the vehicle vertical direction such that the bottom side 156 of the reinforcement patch 150 is detached and spaced apart from the bottom side 136 of the reinforcement beam 130. The lower rib 164 may extend in the vehicle lateral direction across the bottom side 136 of the reinforcement beam 130 and may be positioned between the front side 132 and the rear side 137 of the reinforcement beam 130 in the vehicle longitudinal direction. The lower rib 164 may be positioned forward of a lower securement position 172 that couples the bottom side 156 of the reinforcement patch 150 to the bottom side 136 of the reinforcement beam 130.

The lower rib 164 may have a radius of curvature r2. The radius of curvature r2 of the lower rib 164 may increase a resistance to bending of the reinforcement patch 150 about the vehicle vertical direction. By increasing the resistance to bending of the reinforcement patch 150 about the vehicle vertical direction, the lower rib 164 may resist and redirect forces that may be applied to a limited portion of the reinforcement patch 150, such as bending forces associated with a small front bumper overlap impact that may act to bend portions of the reinforcement beam 130 inboard in the vehicle lateral direction toward the side support 112.

The upper rib 162 and the lower rib 164 may form an upper channel 163 and a lower channel 165, respectively, that are at least partially enclosed between the reinforcement beam 130 and the reinforcement patch 150. The upper channel 163 and/or the lower channel 165 may be hollow. In some embodiments, an energy absorbent material, such as a foam or the like, may fill or partially fill the upper channel 163 and/or the lower channel 165. In embodiments where the upper channel 163 and/or the lower channel 165 are filled or partially filled, the energy absorbent material may have a strength and/or stiffness that are lower than the strength and/or stiffness of the reinforcement beam 130 and the reinforcement patch 150. The upper channel 163 and the lower channel 165 may extend in the vehicle lateral direction across the top side 154 and the bottom side 156 of the reinforcement patch 150. The upper rib 162 and/or the lower rib 164, and more specifically the upper channel 163 and/or the lower channel 165 formed by the upper and lower rib 162, 164, may selectively reduce the stiffness of the reinforcement patch 150 evaluated in the vehicle longitudinal direction, which may encourage the reinforcement patch 150 to preferentially deform during a flat frontal barrier impact. In other words, the upper rib 162 and/or the lower rib 164 of the longitudinal deformation feature 160 may facilitate initial deformation of the reinforcement patch 150 while providing the reinforcement patch 150 with increased resistance to bending in the vehicle lateral direction.

When a barrier impacts a vehicle, vehicle structures may elastically and plastically deform to absorb energy while slowing the vehicle from its previous operating speed. The vehicle structures divert and absorb the energy associated with the moving vehicle into energy that deforms the vehicle structures. The vehicle structures may be designed to accommodate the introduction of the energy of the impact, such that the energy associated with the impact may be controllably dissipated and directed through selective and preferential deformation of the vehicle structures.

A barrier may impact a front corner of the vehicle in what is referred to herein as a small front bumper overlap or a small overlap impact. In a small front bumper overlap impact, the impact occurs at an outboard portion of the vehicle (evaluated in the vehicle lateral direction), and the barrier only impacts a portion of the front bumper. In some small front bumper overlap impacts, the barrier only impacts about 25% of the front bumper evaluated in the vehicle lateral direction.

In other impact configurations, a barrier may impact the front of the vehicle in what is referred to herein as a flat frontal barrier impact. In a flat frontal barrier impact, the barrier impacts a substantial portion of the front bumper (evaluated in the vehicle lateral direction). In some flat frontal barrier impacts, the barrier may impact greater than 25% of the front bumper evaluated in the vehicle lateral direction.

Referring to FIG. 2 and as described hereinabove, the bumper beam assembly 122 may include the reinforcement patch 150 that is positioned at the outboard end 135 of the reinforcement beam 130. The reinforcement patch 150 may resist forces applied to the outboard end 135 of the reinforcement beam 130, such as forces associated with a small front bumper overlap impact, such that the forces may be redirected into the side support 112 and/or other energy absorbing structures of the vehicle 100. Further, as described hereinabove, the top side 154 and/or the bottom side 156 (FIG. 3) of the reinforcement patch 150 may increase the section modulus of the bumper beam assembly 122 as compared to a bumper beam assembly 122 that does not include a reinforcement patch 150 with a top side 154 and a bottom side 156. By increasing the section modulus, the top side 154 and/or the bottom side 156 may assist in resisting and redirecting forces associated with a small front bumper overlap into the side support 112 and/or other energy absorbing structures of the vehicle. By resisting and redirecting forces associated with a small front bumper overlap impact, the reinforcement patch 150 may increase the amount of energy that may be directed into the side support 112 and/or other energy absorbing structures of the vehicle 100, thereby reducing the amount of energy associated with the impact that is directed into the cabin 108 (FIG. 1) of the vehicle 100.

As described hereinabove and referring to FIG. 3, the reinforcement patch 150 includes a longitudinal deformation feature 160 that is detached and spaced apart from the top side 134 and/or the bottom side 146 of the reinforcement beam 130. The longitudinal deformation feature 160 may include the upper rib 162 that forms the upper channel 163 that is at least partially enclosed between the reinforcement beam 130 and the reinforcement patch 150. The longitudinal deformation feature 160 may also or may alternatively include the lower rib 164 that forms the lower channel 165 that is at least partially enclosed between the reinforcement beam 130. The upper rib 162 and the lower rib 164 may include the radii of curvature r1, r2, which may resist forces that may act to bend the reinforcement patch 150 about the vehicle vertical direction, such as forces associated with a small front bumper overlap impact.

Figure 4:
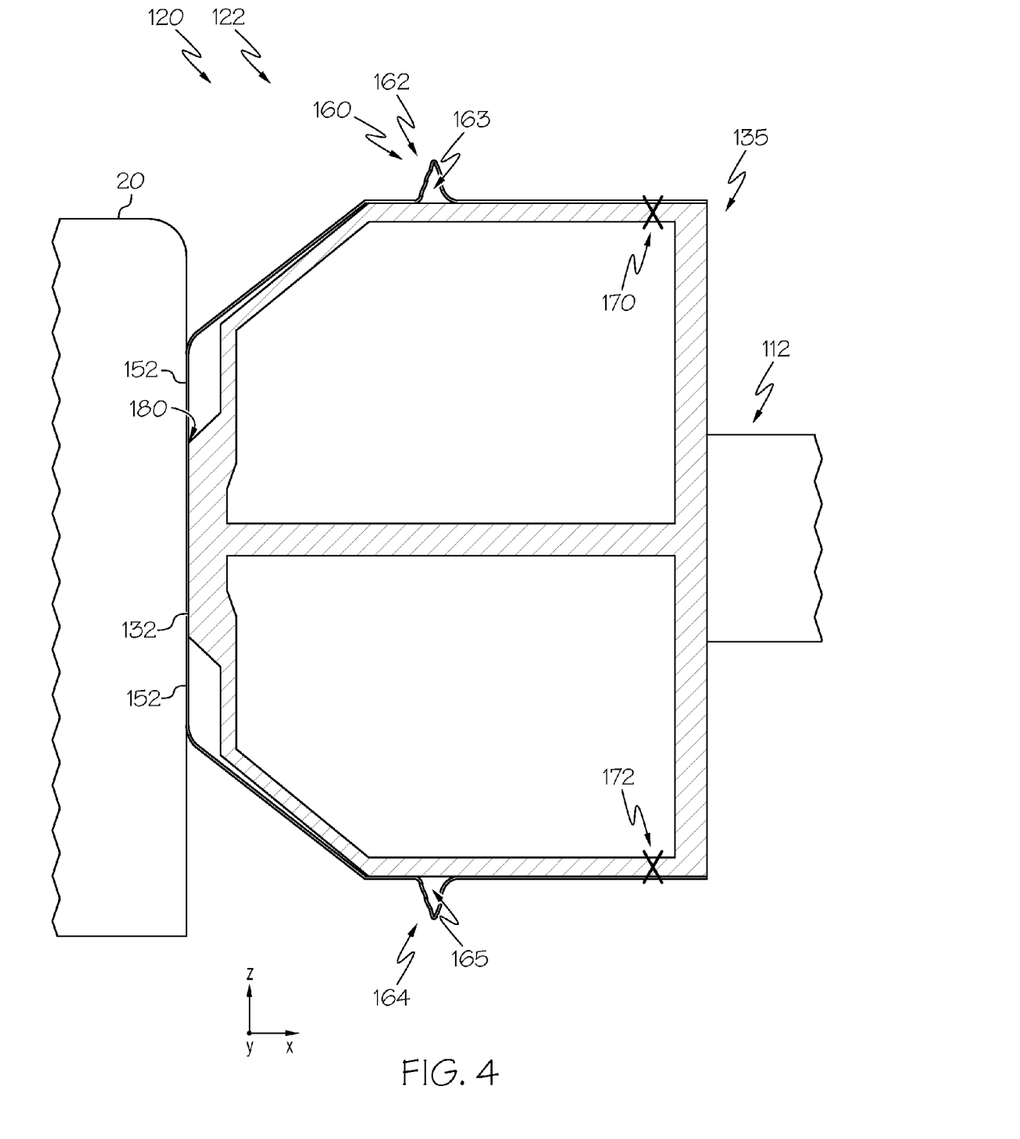
FIG. 4 schematically depicts a section view of the reinforcement beam and the reinforcement patch of FIG. 3 during a flat frontal barrier impact according to one or more embodiments shown or described herein.

Referring now to FIG. 4, the bumper beam assembly 122 is depicted during a flat frontal barrier impact. During a flat frontal barrier impact, a barrier 20 may impact the front side 152 of the reinforcement patch 150. As the barrier 20 impacts the front side 152 of the reinforcement patch 150, the reinforcement patch 150 may plastically and elastically deform, absorbing energy associated with the impact, and the front side 152 of the reinforcement patch 150 may translate rearward in the vehicle longitudinal direction. The front side 152 of the reinforcement patch 150 may translate rearward in the vehicle longitudinal direction, collapsing the gap 180 between the front side 152 of the reinforcement patch 150 and the front side 132 of the reinforcement beam 130. As noted hereinabove, the top side 154 and the bottom side 156 of the reinforcement patch 150 may be coupled to the top side 134 and the bottom side 136 of the reinforcement beam at the upper securement location 170 and the lower securement location 172, respectively. Further, the upper rib 162 and the lower rib 164 may be positioned forward of the upper securement location 170 and the lower securement location 172 in the vehicle longitudinal direction. Accordingly, the reinforcement patch 150 may be relatively rigidly secured to the reinforcement beam 130 at positions rearward of the upper rib 162 and the lower rib 164 such that as the front side 152 of the reinforcement patch 150 translates rearward, the upper channel 163 and/or the lower channel 165 may collapse in the vehicle longitudinal direction. As the upper channel 163 and the lower channel 165 may collapse in the vehicle longitudinal direction, the front side 152 of the reinforcement patch 150 may contact the front side 132 of the reinforcement beam 130, and energy associated with the flat frontal barrier impact may be directed into the reinforcement beam 130. The reinforcement beam 130 and the reinforcement patch 150 may subsequently plastically and elastically deform and absorb energy associated with the impact, thereby decreasing the energy associated with the impact that is directed into the cabin 108 of the vehicle 100.

As the upper channel 163 and/or the lower channel 165 may collapse in the vehicle longitudinal direction, the upper rib 162 and/or the lower rib 164 may effectively decrease the strength and/or stiffness of the reinforcement patch 150 evaluated in the vehicle longitudinal direction during a flat frontal barrier impact. However, by collapsing the upper channel 163 and/or the lower channel 165 in the vehicle longitudinal direction, the reinforcement patch 150 may selectively deform such that energy associated with the flat frontal barrier impact may be directed into the reinforcement beam 130. Accordingly, by reducing the strength and/or stiffness of the reinforcement patch 150, the reinforcement patch 150 may increase the amount of energy absorbed by the bumper beam assembly 122, as opposed to a bumper assembly that includes a reinforcement patch that does not selectively deform, and may translate rearward without directing energy associated with the impact into the reinforcement beam 130.

Further, while the upper rib 162 and/or the lower rib 164 may reduce the strength and/or stiffness of the reinforcement patch 150 evaluated in the vehicle longitudinal direction during a flat frontal barrier impact, at least initially, as described hereinabove, the reinforcement patch 150 may also resist and redirect forces associated with a small overlap impact. In particular, while the upper rib 162 and/or the lower rib 164 may reduce the strength and/or stiffness of the reinforcement patch 150 during a flat frontal barrier impact, the radii of curvature r1, r2 of the upper rib 162 and/or the lower rib 164 may resist bending of the reinforcement patch 150 about the vehicle vertical direction, which may resist and redirect forces associated with a small front bumper overlap impact.

It should now be understood that bumpers according to the present disclosure may include a reinforcement beam and a reinforcement patch. The reinforcement beam includes a front side, a top side, and a bottom side that is positioned opposite of the top side of the reinforcement beam. The reinforcement patch of the bumper beam assembly extends across the top side and the bottom side of the reinforcement beam and the reinforcement patch includes a longitudinal deformation feature that is detached and spaced apart from at least one of the top side and the bottom side of the reinforcement beam. In one embodiment, the bumper beam assembly is coupled to a side support of the vehicle. In another embodiment, the longitudinal deformation feature includes an upper rib that forms an upper channel that is at least partially enclosed between the reinforcement beam and the reinforcement patch, where when a barrier impacts the bumper beam assembly in a flat frontal barrier impact, the upper channel collapses in the vehicle longitudinal direction. As the upper channel collapses in the vehicle longitudinal direction, the upper rib may selectively reduce a strength and/or stiffness of the reinforcement patch evaluated in the vehicle longitudinal direction which may encourage the reinforcement patch to plastically and elastically deform during a flat frontal barrier impact. By plastically and elastically deforming, the reinforcement patch may absorb energy associated with the flat frontal barrier impact, thereby reducing the amount of energy associated with the impact that may be directed into the cabin of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bumper beam assembly comprising:
    a reinforcement beam that extends in a vehicle lateral direction, the reinforcement beam comprising:
        a front side that is oriented to face forward in a vehicle longitudinal direction that is transverse to the vehicle lateral direction;
        a top side that is oriented to face in a direction that is transverse to the front side of the reinforcement beam; and
        a bottom side that is oriented to face in a direction that is transverse to the front side of the reinforcement beam and is positioned opposite of the top side of the reinforcement beam; and
    a reinforcement patch coupled to the reinforcement beam, wherein the reinforcement patch extends across the top side and the bottom side of the reinforcement beam and extends across the front side between the top side and the bottom side of the reinforcement beam in a vehicle vertical direction, the reinforcement patch comprising:
        a longitudinal deformation feature that is detached and spaced apart from at least one of the top side and the bottom side of the reinforcement beam, the longitudinal deformation feature comprising at least one rib that is detached and spaced apart from at least one of the top side and the bottom side of the reinforcement beam, wherein the at least one rib is positioned between the front side and a rear side of the reinforcement beam in the vehicle longitudinal direction, and wherein the at least one rib extends in the vehicle lateral direction.

2. The bumper beam assembly of claim 1, wherein the reinforcement patch is coupled to an outboard end of the reinforcement beam.

3. The bumper beam assembly of claim 1, wherein the longitudinal deformation feature extends upward from and is detached and spaced apart from the top side of the reinforcement beam in a vehicle vertical direction, and the longitudinal deformation feature extends downward from and is detached and spaced apart from the bottom side of the reinforcement beam in the vehicle vertical direction.

4. The bumper beam assembly of claim 1, wherein the at least one rib comprises a radius of curvature and the at least one rib forms a channel that is partially enclosed between the reinforcement patch and the reinforcement beam.

5. The bumper beam assembly of claim 1, wherein the longitudinal deformation feature of the reinforcement patch comprises an upper rib positioned on a top side of the reinforcement patch that is detached and spaced apart from the reinforcement beam and a lower rib positioned on a bottom side of the reinforcement patch that is detached and spaced apart from the reinforcement beam, wherein the upper rib forms an upper channel that is at least partially enclosed between the reinforcement patch and the reinforcement beam and the lower rib forms a lower channel that is at least partially enclosed between the reinforcement patch and the reinforcement beam.

6. The bumper beam assembly of claim 1, wherein the reinforcement beam further comprises a first chamfered side that is positioned between the front side and the top side of the reinforcement beam in the vehicle longitudinal direction and a second chamfered side that is positioned between the front side and the top side in the vehicle longitudinal direction.

7. A vehicle comprising:
a side support that extends in a vehicle longitudinal direction;
a bumper beam assembly coupled to the side support, the bumper beam assembly comprising:
a reinforcement beam that extends in a vehicle lateral direction, the reinforcement beam comprising:
a front side that is oriented to face forward in the vehicle longitudinal direction;
a top side that is oriented to face in a direction that is transverse to the front side of the reinforcement beam; and
a bottom side that is oriented to face in a direction that is transverse to the front side of the reinforcement beam and is positioned opposite of the top side of the reinforcement beam; and
a reinforcement patch coupled to the reinforcement beam, wherein the reinforcement patch extends across the top side and the bottom side of the reinforcement beam and extends across the front side between the top side and the bottom side of the reinforcement beam in a vehicle vertical direction, the reinforcement patch comprising:
a longitudinal deformation feature that is detached and spaced apart from at least one of the top side and the bottom side of the reinforcement beam, the longitudinal deformation feature comprising at least one rib that is detached and spaced apart from at least one of the top side and the bottom side of the reinforcement beam, wherein the at least one rib is positioned between the front side and a rear side of the reinforcement beam in the vehicle longitudinal direction, and wherein the at least one rib extends in the vehicle lateral direction.

8. The vehicle of claim 7, wherein the reinforcement patch is coupled to the reinforcement beam such that at least a portion of the reinforcement patch is positioned outboard of the side support.

9. The vehicle of claim 7, wherein the longitudinal deformation feature extends upward from and is detached and spaced apart from the top side of the reinforcement beam from in a vehicle vertical direction, and the longitudinal deformation feature extends downward from and is detached and spaced apart from the bottom side of the reinforcement beam in the vehicle vertical direction.

10. The vehicle of claim 7, wherein the at least one rib comprises a radius of curvature and the at least one rib forms a channel that is partially enclosed between the reinforcement patch and the reinforcement beam.

11. The vehicle of claim 7, wherein the longitudinal deformation feature of the reinforcement patch comprises an upper rib positioned on a top side of the reinforcement patch that is detached and spaced apart from the reinforcement beam and a lower rib positioned on a bottom side of the reinforcement patch that is detached and spaced apart from the reinforcement beam, wherein the upper rib forms an upper channel that is at least partially enclosed between the reinforcement patch and the reinforcement beam and the lower rib forms a lower channel that is at least partially enclosed between the reinforcement patch and the reinforcement beam.

12. The vehicle of claim 7, wherein the reinforcement beam further comprises a first chamfered side that is positioned between the front side and the top side of the reinforcement beam in the vehicle longitudinal direction and a second chamfered side that is positioned between the front side and the top side in the vehicle longitudinal direction.

13. A vehicle comprising:
a side support that extends in a vehicle longitudinal direction;
a bumper beam assembly coupled to the side support, the bumper beam assembly comprising:
a reinforcement beam that extends in a vehicle lateral direction, the reinforcement beam comprising:
a front side that is oriented to face forward in the vehicle longitudinal direction;
a top side that is oriented to face in a direction that is transverse to the front side of the reinforcement beam; and
a bottom side that is oriented to face in a direction that is transverse to the front side of the reinforcement beam and is positioned opposite of the top side of the reinforcement beam; and
a reinforcement patch coupled to the top side of the reinforcement beam at an upper securement location, wherein the reinforcement patch extends across the top side and the bottom side of the reinforcement beam and extends across the front side between the top side and the bottom side of the reinforcement beam in a vehicle vertical direction, and wherein the reinforcement patch comprises:
a longitudinal deformation feature comprising an upper rib that is detached and spaced apart from the top side of the reinforcement beam, wherein the upper rib is positioned forward of the upper securement location in the vehicle longitudinal direction and is positioned between the front side and a rear side of the reinforcement beam in the vehicle longitudinal direction, and wherein the upper rib extends in the vehicle lateral direction across the top side of the reinforcement beam, the upper rib forming an upper channel that is at least partially enclosed between the reinforcement beam and the reinforcement patch, wherein when a barrier impacts the bumper beam assembly in a flat frontal barrier impact, the upper channel collapses in the vehicle longitudinal direction.

14. The vehicle of claim 13, wherein the reinforcement patch is coupled to the bottom side of the reinforcement beam at a lower securement location, wherein the longitudinal deformation feature of the reinforcement patch further comprises a lower rib that is positioned forward of the lower securement location and that extends in the vehicle lateral direction across the bottom side of the reinforcement beam, the lower rib forming a lower channel that is at least partially enclosed between the reinforcement beam and the reinforcement patch, wherein when the barrier impacts the vehicle in the flat frontal barrier impact, the lower channel collapses in the vehicle longitudinal direction.

15. The vehicle of claim 14, wherein the upper rib and the lower rib comprise a radius of curvature.

16. The vehicle of claim 13, wherein at least a portion of the reinforcement patch is positioned outboard of the side support in the vehicle lateral direction.

\* \* \* \* \*